FIG. I.

United States Patent Office 3,470,108
Patented Sept. 30, 1969

3,470,108
STRONTIUM-BARIUM HALOPHOSPHATE PHOSPHOR
Richard C. Ropp, North Caldwell, N.J., assignor to Westinghouse Electric Corporation, Pittsburgh, Pa., a corporation of Pennsylvania
Filed Mar. 2, 1967, Ser. No. 620,073
Int. Cl. C09k 1/36
U.S. Cl. 252—301.6    3 Claims

ABSTRACT OF THE DISCLOSURE

Halophosphate phosphor is strontium-barium fluoroapatite, activated by antimony, and displays a very efficient blue-green emission suitable for blending with other phosphor materials to achieve a desired color.

BACKGROUND OF THE INVENTION

So-called halophosphate phosphor materials are described in detail in U.S. Patent No. 2,488,733, dated Nov. 22, 1949. These halophosphate phosphor materials now comprise the major phosphor material which is utilized in fluorescent lamps. The best-known, commercial halophosphate phosphor is a calcium chlorofluoroapatite activated by antimony, or, more usually, by both antimony and manganese. Strontium-halophosphates are also known and are described in U.S. Patent No. 2,968,626, dated Jan. 17, 1961. Halophosphate phosphors, as used in conjunction with fluorescent lamps, are either single component materials or are present as a component of a blend. In some cases, as many as three, and sometimes five, phosphor components are required to produce the exact desired spectral properties for a given blend, and an example of such a blend is a so-called Cool White Deluxe blend.

In order to supply the "bluish" component of such a phosphor blend, it is desirable to have the bluish-emitting phosphor operate as efficiently as possible and, to date, bluish-emitting phosphors have been relatively inefficient.

SUMMARY OF THE INVENTION

It is the general object of the present invention to provide a halophosphate phosphor which has a bluish emission and which performs very efficiently.

It is another object to provide a halophosphate phosphor which has a bluish emission and which is particularly suitable for use with other phosphors in forming blends of predetermined emission colors.

The foregoing objects of the invention, and other objects which will become apparent as the description proceeds, are achieved by providing a strontium-barium fluoroapatite matrix which is activated by antimony, wherein all of the constituents of the phosphor are carefully controlled with respect to one another and wherein the barium is included in the raw mix used to prepare the phosphor as a barium compound which decomposes on heating to barium oxide.

BRIEF DESCRIPTION OF THE DRAWINGS

For a better understanding of the present invention reference should be had to the accompanying drawings, wherein.

DESCRIPTION OF THE PREFERRED EMBODIMENTS

The constituents which comprise the present phosphor must be carefully controlled, in order to obtain good performance for the phosphor. It is convenient to express the relative amounts of the constituents with respect to a fixed amount of the phosphate, as detailed in the following paragraphs.

In the present phosphor, only a very slight excess of phosphate is used, as compared to that amount which is regarded as stoichiometric, in order to achieve the best output, whereas in most commercial halophosphate phosphors, a larger excess of phosphate is required for best output. Accordingly, in the present phosphor the gram-atom ratio of total strontium plus barium plus antimony per gram mole of phosphate radical should be greater than 4.875/3.00 and less than 4.975/3.00, with the optimum ratio being about 4.950/3.00.

The ratio of gram atoms of barium per gram mole of the phosphate radical should be greater than 0.244/3.00 and less than 1.990/3.00, with the optimum ratio being about 0.982/3.00.

The ratio of gram atoms of fluorine per gram mole of phosphate radical should be greater than 0.85/3.00 and less than 1.00/3.00, with the optimum being a ratio of about 0.96/3.00.

The antimony activator is present in such amount that the ratio of gram atoms of antimony to gram moles of phosphate radical is greater than 0.010/3.00 and less than 0.080/3.00, with the optimum ratio of antimony to phosphate radical being about 0.040/3.00.

The present phosphor can be expressed by the formula:

$$Sr_{(a)}Ba_{(b)}F_{(c)}(PO_4)_{3.00}:Sb_{(d)}$$

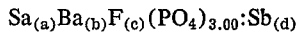

wherein:

$4.875 < (a+b+d) < 4.975$
$0.244 < b < 1.990$
$0.85 < c < 1.00$
$0.010 < d < 0.080$
$0.60/0.40 < a/b < 0.95/0.05$.

At the extremes of the foregoing ranges of total metal to phosphate, barium to phosphate, fluorine to phosphate, and antimony to phosphate, the output of the phosphor will drop somewhat.

Figure 1:
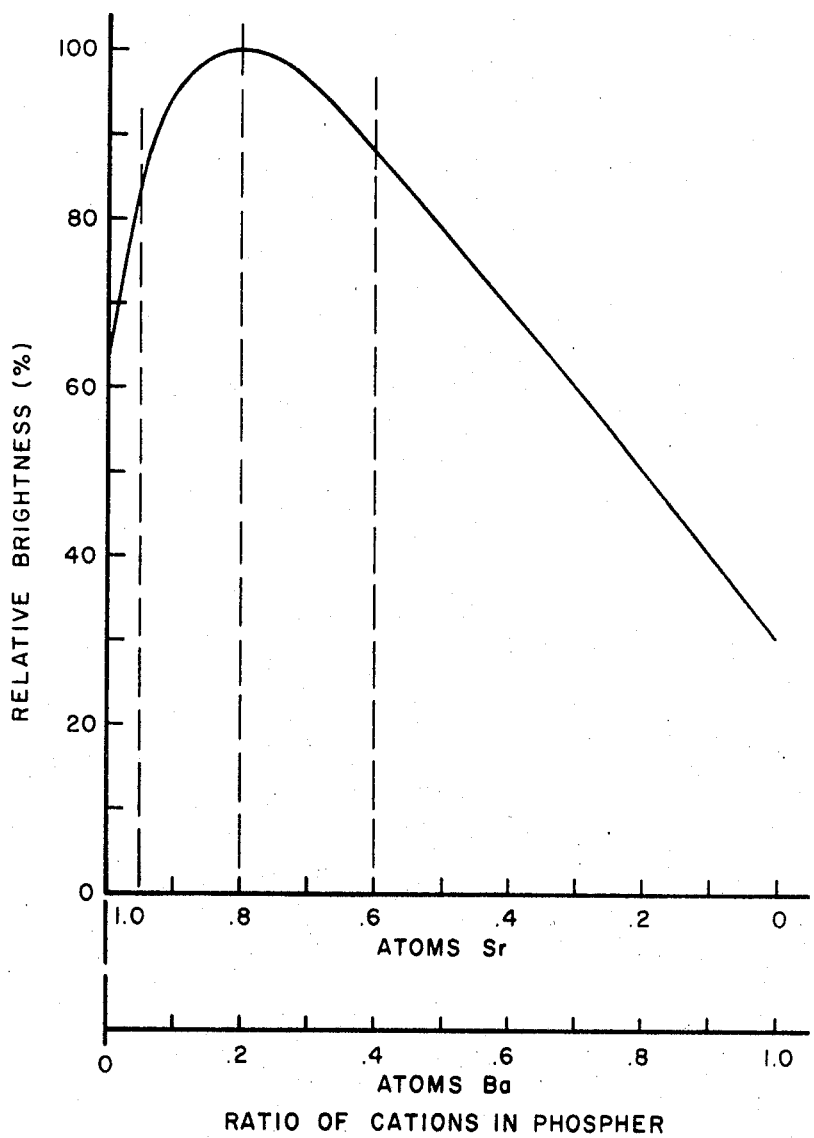
FIG. 1 is a graph of relative brightness versus the proportions of strontium to barium in the present phosphor.

The effect of varying the relative proportions of strontium to barium in the present phosphor is shown in FIG. 1, wherein relative brightness is plotted versus the relative gram-atom concentrations of strontium and barium in the phosphor. The gram-atom ratio of strontium to barium should be greater than 0.60/0.40 and less than 0.95/0.05 and the optimum gram-atom ratio of strontium to barium is about 0.80/0.20.

The present phosphor is quite unusual in that it is necessary to introduce the barium into the raw mix used to prepare the phosphor in the form of a barium compound which decomposes on heating to the oxide. The preferred barium compound which is used in the phosphor raw mix is barium carbonate, although other barium compounds which form the oxide on heating, such as the oxalate or the acetate, could be substituted for the carbonate. If barium is introduced into the raw mix as the fluoride or the phosphate, the brightness of the resulting phosphor is drastically reduced.

As an example for preparing the present phosphor, 553 grams of strontium acid phosphate (assay 99.6% purity) are mixed with 70.6 grams strontium carbonate, 57.8 grams strontium fluoride, 196 grams barium carbonate and 5.83 grams antimony trioxide. The foregoing raw mix constituents are blended together by hammer milling and are then placed in a covered 500 ml.

silica and fired for 4 hours in air at a temperature of 1150° C. The resulting cake of phosphor is loosely broken up, milled, washed with a 1% solution of nitric acid, and then water washed. The ultrafine particles desirably are removed by a water elutriation or equivalent technique. Thereafter, the resulting phosphor is dried and screened through a 325-mesh seive to remove the very large particles. The finished material has an extremely high brightness and a blue-green emission which is particularly suitable for blending with other phosphor materials to achieve desired spectral effects.

As a second example, 553 grams of strontium acid phosphate is mixed with 70.6 grams strontium carbonate, 57.8 grams strontium fluoride, 196 grams barium carbonate, 10.4 grams cadmium carbonate and 5.83 grams antimony trioxide. The blending, firing and processing conditions of Example I are repeated, except that the firing conditions are 1100° C. for a period of 4 hours. The resulting phosphor has a bright blue-green emission. The effect of the cadmium as used in Example II is to increase the output of the phosphor, and in this respect, the present phosphor is quite similar to most halophosphates. The cadmium can be used in such amount that the ratio of gram atoms of cadmium per gram mole of phosphate radical is from 0.01/3.00 to 0.10/3.00 with a ratio of about 0.06/3.00 being optimum.

Figure 2:
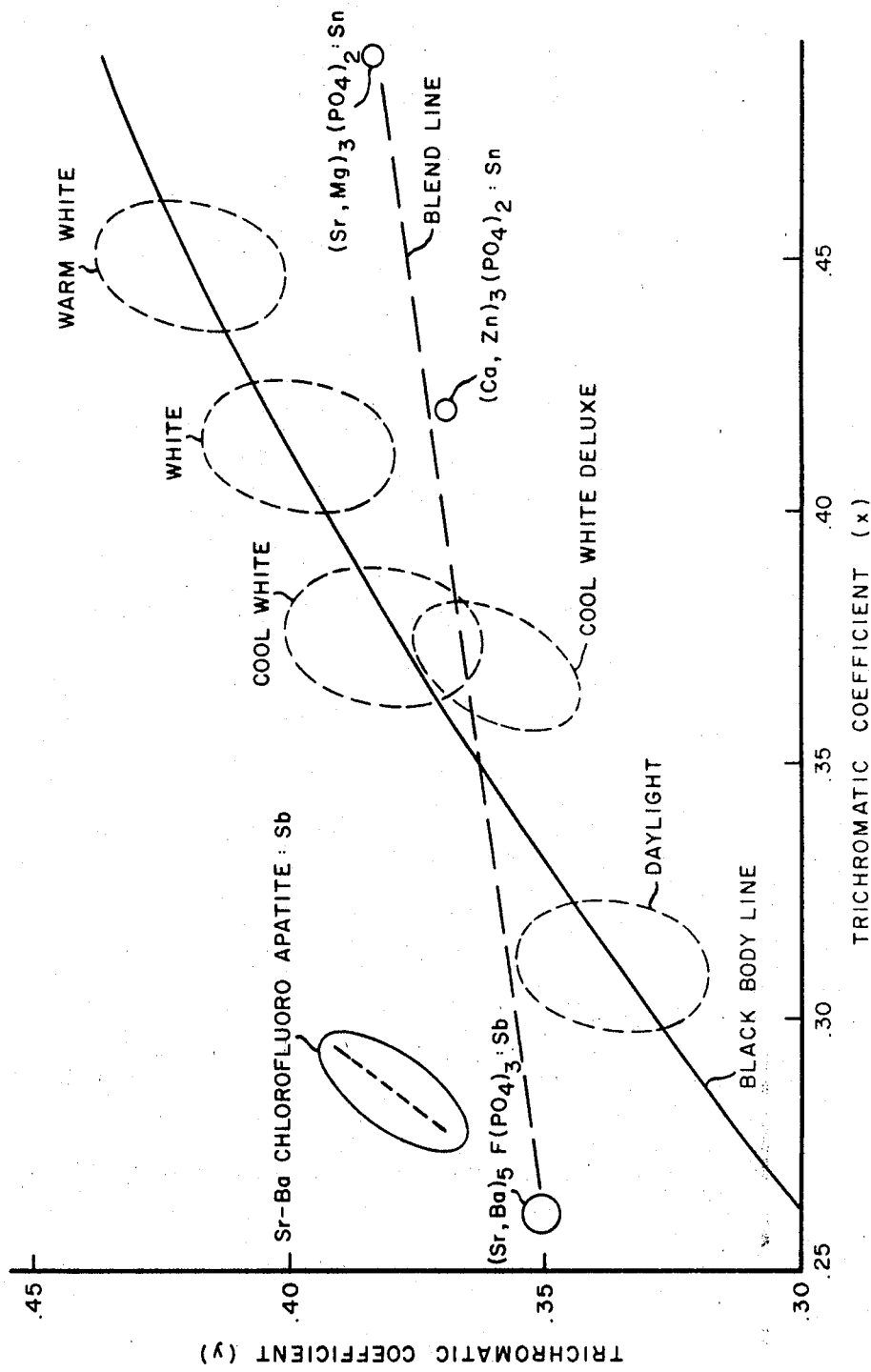
FIG. 2 is a small section of an ICI diagram illustrating the ICI coordinates for the present phosphor as well as one example of a blend which incorporates the present phosphor.

In FIG. 2 are illustrated the ICI coordinates of the present phosphor as well as a typical blend which incorporates the present phosphor, wherein the other constituent of the phosphor is the well known strontium-magnesium phosphate which is activated by stannous tin. Alternatively, a thin-activated calcium-zinc phosphate, whose color coordinates are also shown could be used in the blend. These indicated phosphors can readily be blended in the manner as illustrated in FIG. 2, in order to achieve a Cool White Deluxe color.

It is necessary that the present phosphor contain substantially no chlorine or the output will be diminished and the color shifted, with the amount of color shift depending upon the amount of chlorine which is incorporated into the structure. In FIG. 2 is shown the effect on color of introducing chlorine into the raw mix, wherein the resulting color is designated by the ellipse identified as Sr-Ba chlorfluoroapatite:Sb. Other commercially established ellipses are also shown in FIG. 2 and are identified by their usual color indicia. The present phosphor can be blended with other known phosphors in order to achieve these other indicated colors.

The present phosphor can be used to replace the well-known, commercially available barium titanium phosphate in blends and can also be used to replace a blue-green-emitting strontium halophosphate which is activated by antimony. The present phosphor is extremely efficient. The best phosphor of the prior art which has a similar color is the halophosphate strontium activated by antimony, and the efficiency of the present phosphor is improved over this prior-art phosphor by 150%. This of course is manifested by improved performance of the blends which incorporate the present phosphor.

It will be recognized that the objects of the invention have been achieved by providing an improved halophosphate phosphor which has a very efficient blue-green emission, and which phosphor is particularly suitable for use in phosphor blends, particularly with fluorescent lamps.

While preferred examples of the invention have been illustrated and described in detail, it is to be particularly understood that the invention is not limited thereto or thereby.

I claim as my invention:

1. A halophosphate phosphor having the general formulation

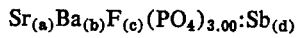

wherein:

$4.875 < (a+b+d) < 4.975$
$0.244 < b < 1.990$
$0.85 < c < 1.00$
$0.010 < d < 0.080$
$0.60/0.40 < a/b < 0.95/0.05$ and barium having been included in the raw-mix used to prepare said phosphor as a compound which decomposes on heating to barium oxide.

2. The halophosphate phosphor as specified in claim 1, wherein $a+b+c$ is about 4.950, $b$ is about 0.982, $c$ is about 0.96, $d$ is about 0.040, and the ratio of $a/b$ is about 0.80/0.20, and barium having been included as barium carbonate in the raw-mix used to prepare the phosphor.

3. The halophosphate phosphor as specified in claim 1, wherein said phosphor also includes from 0.01 to 0.10 gram-atoms of cadmium per 3.00 gram-moles of phosphate radical.

References Cited

UNITED STATES PATENTS 2,809,167 10/1957 McKeag.
2,986,529 5/1961 McKeag et al.

TOBIAS E. LEVOW, Primary Examiner

R. D. EDMONDS, Assistant Examiner

U.S. Cl. X.R.

252—301.4